March 2, 1965  F. E. COYLE ETAL  3,171,281
REPLACEABLE SENSOR TEST DEVICE
Filed March 14, 1963  2 Sheets-Sheet 1

INVENTOR
Forrest E. Coyle
Philip E. Atkinson, Jr

BY Claude Funkhouser
ATTORNEY

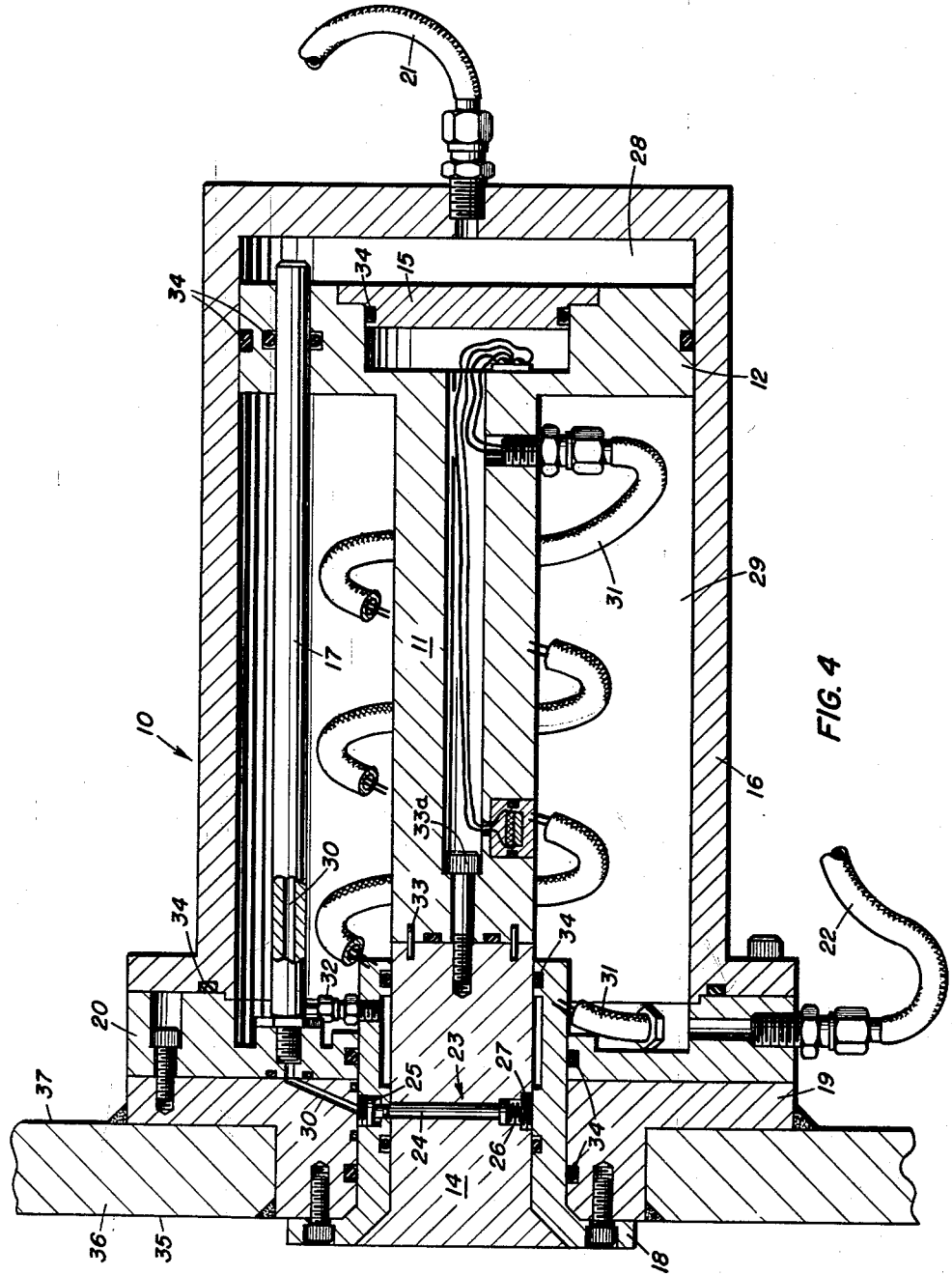

United States Patent Office 3,171,281
Patented Mar. 2, 1965

3,171,281
REPLACEABLE SENSOR TEST DEVICE
Forrest E. Coyle, Glen Burnie, and Philip E. Atkinson, Jr., Baltimore, Md., assignors, by mesne assignments, to the United States of America as represented by the Secretary of the Navy
Filed Mar. 14, 1963, Ser. No. 265,297
7 Claims. (Cl. 73—431)

The present invention relates to a measuring or testing apparatus for use in sampling such conditions as pressure, temperature, fluid density, radioactivity, velocity of the body in its medium or the like. More particularly, it relates to a new and novel housing for mounting the sensing element.

One of the more critical problems confronting designers of submarines, space ships or any container apparatus wherein physical conditions must be monitored in a hostile environment to humans whether it be because of the depth or altitude or speed of the vehicle or because of heat or radioactivity, is how to provide a monitoring apparatus having a sensing element that can be replaced if defective or changed if a different type of sensing element is desired, without having to remove the entire vehicle from its present position to a location where the removal can be achieved. For example, in the case of a submarine a replacement or change of sensing apparatus can entail at least surfacing if not drydock. In the case of a space ship it might require return to earth. In the case of a container it might require complete draining of the container and may be the entire system. In any event the alternate possibilities would be expensive if not dangerous.

Prior art sensing apparatus have been mounted permanently outboard of the vehicle or inboard of the container or have been sent outboard and returned through air locks or have been permanently installed through hull penetrations all of which methods severely reduce the flexibility of the monitoring equipment.

The general purpose of this invention is to provide sensing apparatus which allows for servicing or removal of the sensing element (normally a transducer) at any time by hydraulically actuating the sensing device comprising the sealing plug and sensing element housing so that it will retract and while in this retracted position, part of the housing surrounding the element may be removed for servicing.

An object of this invention is the provision of a sensing element that can be freely inserted or removed at all times.

Another object is to provide a hydraulically actuated sensing element that can be extended or withdrawn from a hostile environment at will.

A further object of the invention is the provision of a sensing device a part of which may be removed for repair or for substitution of elements when the sensing element is retracted.

Still another object of the invention is to provide a hydraulically actuated sensing element which may be used in a submarine, space ship or container application.

Yet another object of the invention is the provision of sensing apparatus for use on vehicles carrying out long sojourns into hostile environments which may be maintained or replaced if necessary or desirable.

A still further object is to eliminate the necessity of multiple sensing elements to insure accuracy since various elements can be inserted into the same sensing apparatus to compare readings.

An additional object is to insure a positive separation of environments during replacement of the operating elements.

A further object is to provide a combination sensing and sealing device which acts both as a sensing element and a sealing device for hull penetrations.

Another object is the provision of a sensing element housing which also serves as a hydraulic piston so that the sensing element contained therein may be extended into the medium to be tested.

A further object is the provision of a safety latch in the sealing plug which insures positive locking action when in retract position.

Other objects and features of the invention will hereinafter become more fully apparent from the following description taken in connection with the accompanying drawings in which FIG. 1 is a pictorial view showing the sensing apparatus in a typical installation;

FIG. 4 is a vertical sectional view showing the internal details of the sensing apparatus of a preferred embodiment of the instant invention.

Figure 1:
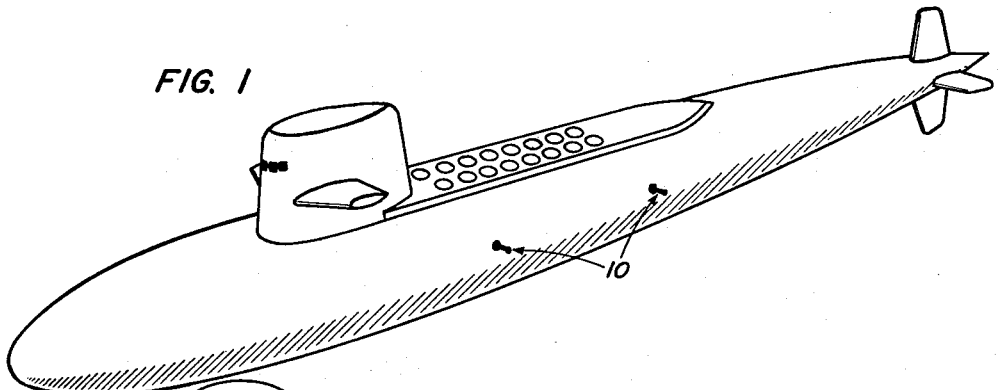
Figure 1:
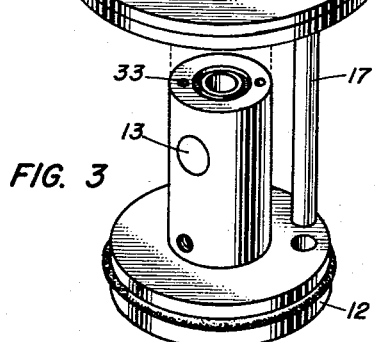

Referring now to FIG. 1 which illustrates a possible use for a sensing apparatus on a missile submarine it may be seen that the submersible unit 10 is mounted so that the sensing element extends into the medium to be tested while humans are protected. This would also be the case in a space ship or when monitoring conditions in a container.

Figure 3:
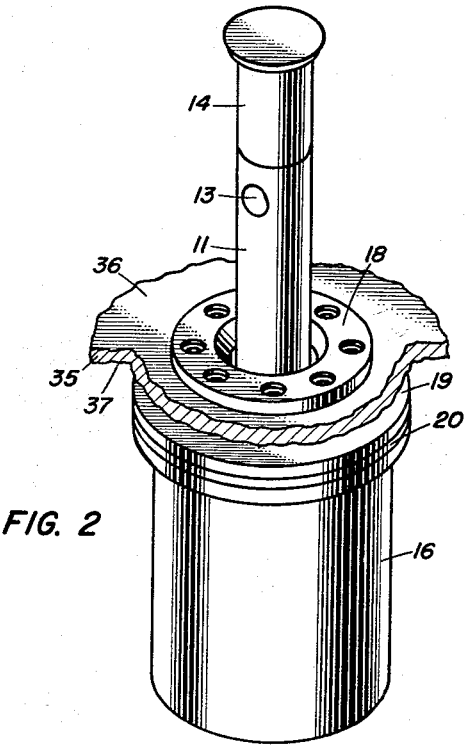
FIG. 3 is an exploded isometric view illustrating the major components of the sensing apparatus.
Figure 2:
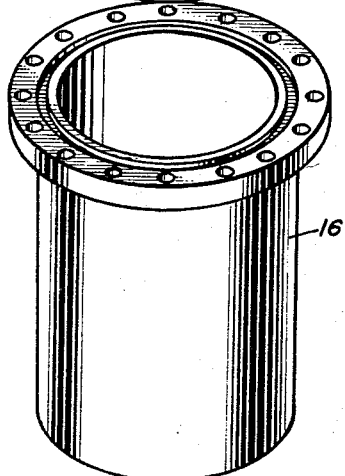
FIG. 2 is an isometric view showing the sensing apparatus in position with the sensing element extended.

Referring now to FIGS. 2, 3 and 4, reference character 10 indicates the submersible unit generally. Reference character 16 designates the actuator housing and 11 identifies the sensing element housing. Reference character 13 locates the sensing element (which is normally a transducer).

Referring now to FIG. 4, the submersible unit comprises a sealing plug 14 which is conical for a part of its length and which is mounted on the sensing element housing 11 by cap screw 33a and aligning pins 33. When so mounted the combined plug and housing are referred to as the sensing device and which cooperates with the complementary end of the guide bearing 18 to provide a fluid tight seal when the sensing element housing is in a retracted position. The sensing element housing 11 is expanded at the end away from the sealing plug to provide a fluid piston 12 acting in the actuator housing 16 and dividing the housing into an extend portion 28 and a retract portion 29. A mounting ring 19 provides a support for the guide bearing 18 and the mounting ring is in turn supported by a base plate 20 which also functions as a mounting plate for the actuator housing 16. A drain for bearing 18 is provided at 32. Mounted in the sealing plug is a safety latch assembly 23 which acts to lock the sensing element housing in a retracted position until a positive signal is given to extend. The positive signal is in the form of hydraulic fluid which acts on both the hydraulic piston and the latch assembly releasing the latch and driving the sensing element housing into extend position. The latch assembly consists of a latch 24, a latch unlocking piston 25, a latch operating spring 26 and a latch and latch spring retainer 27. Fluid passages 30 provide fluid communication between the latch unlocking piston 25 and the hollow guide rod 17. The hollow guide rod 17 is mounted in the base plate 20, extends through the expanded portion 12 of the sensing element housing 11 and contains fluid passages 30 which communicate the latch unlocking piston area with the extend portion 28 of the actuator housing 16. The guide rod also serves the function of locating the sensing element and the latch mechanism in the actuator housing.

The sensing element housing 11 is hollow for a portion to allow for the electrical connections necessary to connect the sensing elements with indicating devices outside the submersible unit. Cable 31 acts as the electrical connection between the sensing element housing 11 and units monitoring outside the submersible unit. Extend pressure inlet 21 and retract pressure inlet 22 provide the fluid necessary for operation of the submersible unit. Cap 15 acts as a sensing element housing base plate sealing the hollow sensing element housing from fluid introduced by the extend pressure inlet 21. O ring seals 34 are located between movable parts to seal off the various fluid pressure areas.

In operation the fluid to be tested is on the outboard side 36 of hull or container wall 35. Reference numeral 37 represents the inboard side of wall 35. Upon an actuating signal hydraulic fluid is introduced through extend pressure inlet 21 and acts on expanded portion 12 of the sensing element housing 11 to extend the sensing element housing and sealing plug 14 into the medium to be monitored or in which monitoring will occur. Retract pressure inlet 22 acts as a drain during this operation. Fluid entering extend chamber 28 simultaneously passes through hollow guide rod 17 by means of passages 30 to act on the safety latch assembly, depressing piston 25 which in turn depresses latch 24 against the pressure of latch operating spring 26 and allows the sealing plug and sensing element housing to extend. When the monitoring operation is complete or a sensing element change is required hydraulic pressure fluid is introduced through retract pressure fluid inlet 22 while the extend pressure inlet acts as a drain. It will be noted that only during the extend operation is pressure fluid acting on the latch mechanism. When the sensing element housing and the sealing plug are in retracted position the retract portion of the actuation housing may be drained and the housing 16 removed for the replacement of the sensing element since the sealing plug 14 and the guide bearing 18 cooperate to seal the opening and latch means 23 provides a positive locking device to insure against accidental dislodgement of the sealing plug. The sensing element housing may be removed from the sealing plug by removing the cap screw 33a and the sensing element 13 taken out for necessary work.

Obviously many modifications and variations of the present invention are possible in the light of the above teachings. It is therefore to be understood that within the scope of the appended claims the invention may be practiced otherwise than as specifically described.

What is claimed is:

1. For use in sensing external conditions surrounding a vehicle or container, a submersible test unit comprising an actuator housing open at one end,
   a mounting ring and base plate to which the actuator housing is mounted at the open end,
   a conically shaped guide bearing mounted in said mounting ring,
   a hydraulically actuated sensing device slidably mounted in said actuator housing,
   a hydraulic piston located on said sensing device and dividing said actuator housing into two portions,
   fluid conduits in communication between said two portions to provide hydraulic fluid flow for actuating the sensing device into extended and retracted positions,
   a conical sealing plug comprising a portion of said sensing device and arranged to cooperate with the conical shaped guide bearing to seal the open end of the guide bearing so that the actuator housing may be removed without an inrush of fluid from the external fluid medium, hydraulically releaseable latch means in said sealing plug adapted to engage an aperture in said guide bearing thereby preventing any undesired movement of said sensing device whereby said latch means may be released thus permitting said sensing device to be extended to obtain data on external conditions surrounding said vehicle.

2. In a sampling unit for use in sampling the environmental conditions surrounding a vehicle carrying said unit, wherein the improvement comprises:
   a vehicle body having an aperture for carrying said unit;
   mounting means received by said aperture and fixedly mounted therein;
   first guide means centrally located in said mounting means;
   said first guide means having a centrally located aperture therein;
   a base plate fixedly secured to said mounting means and having a centrally located aperture in alignment with said aperture in said guide means;
   an actuator housing mounted on said base plate;
   a sealing plug mounted in said guide means;
   a sensing element housing fixedly secured to said sealing plug;
   said sensing element housing having piston means at the remote end thereof;
   second guide means mounted in said base plate and cooperating with said piston means to guide said piston means;
   a sensing element located in the side of said sensing element housing;
   conducting means for transmitting information received by said sensing unit to the interior of said body carrying said sensing unit;
   latch means in said sealing plug for preventing axial movement of said sensing element housing;
   release means in said first guide means for releasing said latch means;
   hydraulic means for moving said sensing element outwardly beyond the body of said vehicle carrying said sensing unit;
   said hydraulic means also being capable of retracting said sensing element within said body whereby said sensing unit may be moved beyond the body of said carrying vehicle to gather the desired information and said sensing unit may be retracted into said body to permit repairing or replacing of the sensing element.

3. In a device of the character described in claim 2 wherein:
   said mounting means comprises a mounting ring;
   said mounting ring having a centrally located bore extending therethrough;
   sealing rings mounted in said mounting ring to prevent leakage of fluid along said bore.

4. In a device of the character described in claim 2 wherein:
   said piston means comprises an enlargement at the end of said sensing element housing;
   said enlargement being capable of alternately being exposed to hydraulic fluid under pressure from either side.

5. In a device of the character described in claim 4 wherein:
   said second guide means comprises an elongated rod which extends substantially the fully length of said actuator housing;
   one end of said elongated rod being threadedly inserted into an aperture in said base plate;
   the other end of said elongated rod extending through said enlargement.

6. In a device of the character described in claim 5 wherein:
   said conducting means comprises a plurality of electrical wires which are operably connected to said sensing unit at one end thereof; and
   a monitoring unit outside sensing unit electrically connected to the other end of said electrical wires.

7. In a device of the character described in claim 6 wherein:

said release means comprises a piston which is operably mounted in said first guide means;

said piston being in axial alignment with said latch whereby downward movement of said piston releases said latch and permits said sensing element housing to be extended beyond the body of said carrying vehicle.

References Cited by the Examiner

UNITED STATES PATENTS

| 867,982 | 10/07 | Lake | 88—69 |
| 2,012,836 | 8/35 | Talbot et al. | 73—423 X |
| 3,077,113 | 2/63 | Mattingly | 73—431 |

RICHARD C. QUEISSER, *Primary Examiner.*

JOSEPH P. STRIZAK, *Examiner.*